United States Patent Office
3,723,191
Patented Mar. 27, 1973

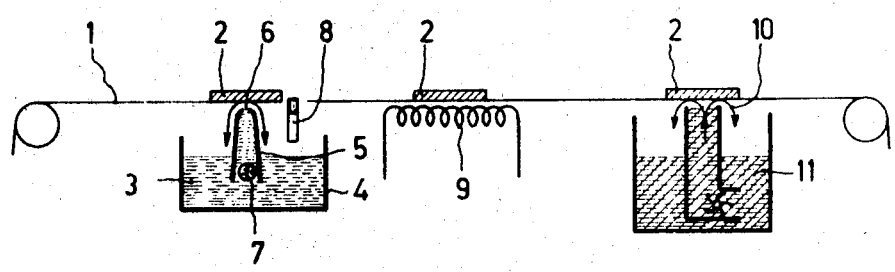

3,723,191
SOLDERING FLUX COMPOSITION
Julius Goeman Bos, Harm Draaijer, and Jan Duyve, Emmasingel, Eindhoven, Netherlands, assignors to U.S. Philips Corporation, New York, N.Y.
Filed Mar. 9, 1971, Ser. No. 122,381
Int. Cl. B23k 35/36
U.S. Cl. 148—23   4 Claims

ABSTRACT OF THE DISCLOSURE

A solution of sorbitol in a water-alcohol mixture for use in a foam fluxing device. The solution comprises activators. Remainders of the flux may be washed off with water and are not corrosive.

---

The invention relates to a solution of a soldering flux which may be provided in the form of a foam on a workpiece and to a method of manufacturing such a solution.

The invention relates particularly to a solution of a soldering flux which may be used when providing soldering metal on component-carrying non-pretinned printed circuit boards having metallized holes. The conducting tracks present on the printed circuit board may be provided with soldering material by means of a soldering machine. To this end the soldering side of the board on which electrical or non-electrical and/or electronic components are present is first coated wtih a thin layer of flux. The purpose of this flux is to clean the metal parts to be coated with solder, to dissolve metal oxides possibly forming during providing the soldering metal and to decrease the surface tension of the molten soldering metal. If the flux is provided in the form of a foam on a workpiece, a very even layer may be obtained at a minimum consumption of the flux.

Solutions which contain colophony as a soldering flux are less suitable for this purpose. In practice, it was found to be difficult to prepare a flux solution on the basis of colophony, which is a natural product, which flux could be provided in a reproducible manner in the form of foam. Colophony has the additional drawback that remainders left on the workpiece after the soldering metal has been provided can only be removed with organic solvents, unless special steps are taken. Some electric components may, however, be provided with envelopes or stamped type notations which are not resistant or poorly resistant to these organic solvents.

A further drawback of fluxes on the basis of colophony is that these usually contain activators which upon decomposition split off halogen or hydro-halogen acids during the application of the soldering metal. If remainders of the flux are left on the workpiece, such activators may give rise to corrosion.

An object of the present invention is to provide a solution of a soldering flux which can be formed to a foam in a reproducible manner and whose remainders can be removed from the workpiece in a simple manner by means of water and which does not contain activators splitting off halogen or halogen hydrogen acids upon decomposition.

According to the invention such a solution of a soldering flux consists of a solution of sorbitol in a water-ethanol mixture which for each part by weight of water contains 0.8 to 3 parts by weight of ethanol and an activator which does not contain halogen and which has one or more amino groups per molecule, the pH of the solution being between 5 and 8.

The solution of the soldering flux according to the invention may be manufactured as follows:

The required quantity of ethanol (for example, ethanol 96%) is added to a solution of sorbitol in water in which also the activator is dissolved. The pH is then adjusted, if necessary, at the desired value by adding a polybasic carboxylic acid to the solution.

Sorbitol is a hexavalent alcohol having a melting point of approximately 93° C. It is very satisfactorily soluble in water and is cheap. 70 and 85% by weight solutions in water are commercially available. These solutions may be rendered anhydrous by means of heating up to 110° C. The commercially available mannitol, likewise a hexavalent alcohol, is unsuitable as a soldering flux in the solutions according to the invention, because tar-like products which are insoluble in water are formed upon decomposition.

The following was found during the experiments which led to the present invention:

Solutions may be obtained wtih sorbitol which can yield a stable foam in a reproducible manner if the solvent contains water and ethanol in a ratio of 1 part by weight of water in 0.8 to 3 parts by weight of ethanol. Foam is not formed when the quantity of ethanol is larger or smaller than the stated quantities.

The quantity of sorbitol per 100 parts by weight of solvent mixture is preferably between 100 and 200 parts by weight. Addition of surface-active materials generally does not have a favourable influence on the formation of foam of the solutions according to the invention.

The solution of the soldering flux according to the invention contains an activator having one or more amino groups per molecule and no halogen.

Such activators are, for example, urea, guanidine, hydrazine, hexamethylenetetramine, triethanolamine, while also amino acids soluble in water-ethanol mixtures such as glycocol may be used.

Guanidine was found to be particularly suitable as an activator. Guanidine is preferably added as a carbonate. A suitable quantity is 5% by weight calculated on the quantity of sorbitol of guanidine carbonate.

It was found that a foam is only obtained if the pH of the solution of the soldering flux lies between 5 and 8. The best results in relation to the stability and the reproducibility were obtained at a pH of approximately 7. If the mixture is to be acidified so as to obtain a pH of between 5 and 8, an organic acid is preferably used which does not contain halogen but can dissolve metal oxides within a short period by means of complexing. Such acids are, for example, hydroxy acids such as citric acid and tartaric acid.

If for some uses the activity of the flux is found to be insufficient, this activity may be increased in a simple manner. To this end the solution of the soldering flux receives an addition of a weak dibasic organic acid or a mixture of these acids from the group formed by the dibasic aliphatic carboxylic acids soluble in ethanol and water whose aliphatic chain contains 4 to 8 carbon atoms. Acids which may be used are adipic acid, azelaic acid and sebacic acid. A suitable quantity is 2 to 7% by weight, for example, 5% by weight calculated on the quantity of sorbitol in the flux. The pH then remains between 5 and 8. The addition of these acids provides the extra advantage that the stability of the solution at high alcohol contents is enhanced. The soldering flux solutions according to the invention are particularly suitable for use in applications where soldering temperatures of between approximately 200 and 300° C. occur.

In order that the invention may be readily carried into effect, it will now be described in greater detail with reference to the following examples.

EXAMPLE I 3.8 kgs. of guanidine carbonate were dissolved while stirring in 75.3 kgs. of a 70% by weight aqueous solution of d-sorbitol. Subsequently 3.0 kgs. of solid citric acid were added to the solution while stirring. The pH of the mixture was approximately 7 after the citric acid had dissolved completely. Subsequently 17 to 23 kgs. of ethanol 96% were added to the mixture dependent on the desired viscosity of the solvent.

The soldering flux was then ready for use.

EXAMPLE II 2.7 kgs. of guanidine carbonate were dissolved while stirring in 54.0 kgs. of a 70% by weight aqueous solution of d-sorbitol. Subsequently 2.15 kg. of citric acid was added to the solution while stirring. The pH of the mixture was approximately 7 after the citric acid had dissolved completely. Subsequently 35–45 kgs. of ethanol 95% and then 2.7 kgs. of adipic acid were added to the mixture. In this case the pH did not change essentially.

The quantity of added ethanol varies to some extent in connection with the thickness of the layer of the flux on the board which is necessary for the correct soldering result. This thickness is determined by experiments within the given limits. The soldering flux was then ready for use.

The invention will further be described with reference to the accompanying diagrammatic drawing whose single figure diagrammatically shows a soldering machine.

The soldering machine consists of a conveyor belt or chain 1 whose speed is adjustable (not shown). The conveyor belt 1 carries racks to which the printed circuit boards 2 to be coated with solder metal are secured. The printed circuit boards are passed over the foam fluxing device 3 by means of this conveyor belt. This fluxing device consists of a container 4 in which a funnel-shaped vessel 5 with its slit 6 on the upper side is placed. The container 4 is partly filled with a soldering flux according to Example 2, in which 40 kgs. of ethanol 96% were added to the mixture. A pourous stone 7 is provided in the funnel-shaped vessel 5, which stone is located underneath the level of the flux. Air is blown through this porous stone, so that the soldering flux starts to foam and is pressed upwards through the slit in the funnel and flows back into the container via the sides. A brush 8 is secured behind this slit in the container. After the printed circuit board has passed the wave of flux foam, the soldering flux is evenly distributed thereon by means of the brush 8.

The printed circuit board 2 wetted with the soldering flux is subsequently passed over a drier 9 which evaporates the solvent and pre-heats the board. After drying, the printed circuit board 2 is passed over a solder wave 10 where the printed circuit board is provided with soldering metal. The solder wave 10 is obtained by pumping up the soldering metal in a container containing molten soldering metal 11 as is shown, for example, in the drawing.

After soldering and cooling the board is washed with hot running water until the soldering flux is removed and then the board is dried (not shown).

The soldering flux solutions according to the invention have the particular advantage that remainders of flux left on the workpiece after providing soldering metal can be washed off simply with water. The electric and electronic components present on the printed circuit boards are generally resistant to high relative humidities so that washing with water does not provide any drawback. It is to be noted that the use of sorbitol as a flux in a soldering paste comprising a soldering metal in a pulverulent form is known from United States Pat. 2,547,711. It is in no way evident from this patent that sorbital is suitable for preparing a flux solution which can be provided as a foam on the workpiece.

What is claimed is:

1. A foam-forming soldering flux composition comprising a solution of from about 100 to 200 parts by weight of sorbitol in about 100 parts by weight of a mixture of ethanol and water, said ethanol and water being in a weight-ratio of 0.8–3 to 1, and as an activator soluble in said ethanol-water solution said activator selected from the group consisting of urea, guanidine, hydrazine, hexamethylenetetramine, triethanolamine, and amino acids, the pH of said solution being between 5 and 8.

2. A soldering flux solution as claimed in claim 1, characterized in that guanidine is present as an activator in the flux.

3. A soldering flux solution as claimed in claim 1, characterized in that the flux is provided with the aid of citric acid at a pH of approximately 7.

4. A soldering flux solution as claimed in claim 3, characterized in that in addition to citric acid the flux contain an effective quantity of a dibasic carboxylic acid.

References Cited

UNITED STATES PATENTS

| | | | |
|---|---|---|---|
| 3,436,278 | 4/1969 | Poliak | 148—23 |
| 2,547,771 | 4/1951 | Pessel | 148—24 |
| 2,690,408 | 9/1954 | Pessel | 148—23 |
| 1,989,557 | 1/1935 | Muller | 148—23 |
| 3,235,414 | 2/1966 | Marks | 148—23 |
| 3,424,625 | 1/1969 | Tiegel | 148—23 |

GEORGE T. OZAKI, Primary Examiner

U.S. Cl. X.R.

29—495